United States Patent
Smith et al.

(10) Patent No.: US 6,764,106 B1
(45) Date of Patent: Jul. 20, 2004

(54) COLD FORM HEX SHELL

(75) Inventors: Patrick A. Smith, South Euclid, OH (US); Gregory Kreczko, Hudson, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/406,080

(22) Filed: Apr. 1, 2003

Related U.S. Application Data

(60) Provisional application No. 60/442,320, filed on Jan. 23, 2003.

(51) Int. Cl.[7] .............................................. F16L 35/00
(52) U.S. Cl. ...................................... 285/256; 285/259
(58) Field of Search ................................ 285/256, 259, 285/330

(56) References Cited

U.S. PATENT DOCUMENTS

| | | | | |
|---|---|---|---|---|
| 2,121,624 A | * | 6/1938 | Cowles | 285/256 |
| 2,470,477 A | * | 5/1949 | Paquin | 296/95.1 |
| 3,549,180 A | * | 12/1970 | MacWilliam | 285/256 |
| 3,590,455 A | * | 7/1971 | Harris | 29/890.144 |
| 3,726,547 A | * | 4/1973 | Cox, Jr. | 285/149.1 |
| 3,924,883 A | | 12/1975 | Frank | |
| 4,093,280 A | * | 6/1978 | Yoshizawa et al. | 285/39 |
| 4,366,841 A | * | 1/1983 | Currie et al. | 138/109 |
| 4,544,187 A | * | 10/1985 | Smith | 285/256 |
| 5,105,854 A | * | 4/1992 | Cole et al. | 138/109 |
| 5,317,799 A | | 6/1994 | Chapman et al. | |
| 5,498,043 A | * | 3/1996 | Goldenberg | 285/242 |
| 6,270,126 B1 | | 8/2001 | Juedes | |
| 6,439,617 B1 | * | 8/2002 | Boer et al. | 285/256 |
| 6,447,020 B1 | | 9/2002 | Kacines et al. | |
| 6,598,906 B2 | * | 7/2003 | Brugmann | 285/256 |

FOREIGN PATENT DOCUMENTS

| | | |
|---|---|---|
| JP | 5-118483 A | 5/1993 |
| WO | WO 94/18487 | 8/1994 |

* cited by examiner

*Primary Examiner*—Eric K. Nicholson
(74) *Attorney, Agent, or Firm*—Joseph J. Pophal

(57) ABSTRACT

A coupling, comprised of a tube with an attached tubular shell, for attachment with external components. The tube has a first end, second end and a longitudinal bore extending therethrough. The tube further includes an intermediate portion between the first and second ends having spaced radially outwardly extending annular beads. The tubular shell has a first portion axially confined between the annular beads and has an inner surface with a first axial end and a second axial end, wherein one of the first and the second inner axial ends has a non-rounded shape. The shell has a second portion extending axially from the first portion to a free end and has an inner surface spaced radially and coaxially outwardly of the exterior of the tube second end to define an annular recess therebetween and is adapted to be inwardly deformed toward the tube second end.

6 Claims, 4 Drawing Sheets

COLD FORM HEX SHELL

CROSS-REFERENCE TO RELATED CASES

The present application claims the benefit of the filing date of U. S. Provisional Application Serial No. 60/442,320 filed Jan. 23, 2003.

FIELD OF THE INVENTION

The field of art to which this invention pertains includes that of hose couplings for attachment with fluid conductors.

BACKGROUND OF THE INVENTION

Fittings are used as connectors in order to link fluid conductors with each other. Fittings generally include a tubular element, or tube, having two ends. The first tube end has an outer surface designed to maintain a swivel nut in a predetermined axial location while allowing the swivel nut to rotate. The second tube end has an outer surface which affixedly retains a tubular shell that circumferentially surrounds this end.

The usually externally hexagonally shaped swivel nut typically has internal threads that serve for attachment to the male port end of a fluid conductor. The swivel nut is sealingly fastened onto the noted male port end with a torquing device to a predetermined tightness. During this fastening process the inner end surface of the swivel nut comes into contact with its adjoining tube end such that friction between the two components will cause the entire tube to rotate with the swivel nut. Typically, prior art fittings include a hexagonal holding surface provided on the tube itself so that the user can hold the tube, via this holding surface, in a static or fixed position while tightening the swivel nut. By virtue of holding the tube in a static position, the desired angle, or orientation of the fitting is maintained. A cost disadvantage associated with the tube holding surface is that this entails another machining or forming process in order to provide such a hexagonal surface on an otherwise cylindrical tube.

The second end of the tube has an end portion that is adapted to be inserted into a conduit. The surrounding shell, which is attached to the second end of the tube, surrounds the conduit. The conduit, or course, is the fluid conductor that is used to transfer fluid from one location to another. Typically, this conduit is flexible so that the fluid can be transferred in multiple directions or angulations without the awkward bending of a rigid pipe. In order to attach the conduit to the fitting, the shell is inwardly deformed so that the intermediate conduit portion is compressed between the shell and the tube.

Rather than providing the tube element with a hexagonally-shaped outer surface, some prior art fittings provide a hexagonally-shaped holding surface on the shell itself. Examples of such a shell are shown in U.S. Pat. No. 4,804,212 to Vyse, which is also assigned to the assignee of the present invention, U.S. Pat. No. 5,317,799 to Chapman et al., and in published PCT Application No. WO 94/18487 to Shiery. These prior art references have hexagonal outer surfaces on the shell which are formed during the inward deformation, or crimping, of the shell onto the conduit. The disadvantage of this type of shell is that the shell can still rotate relative to the conduit and tube while it is being held.

Shells can be fixedly attached to the tube by several methods. As is well known in the art, the inner axial end of the shell can be inwardly deformed, or crimped, onto the tube so that it is compressively attached. Other methods include radially compressing an inwardly directed shoulder of the shell into an annular groove in the tube. This is shown in the previously mentioned U.S. Pat. No. 4,804,212 to Vyse.

Another method of affixing the shell to the tube includes axially compressing an inwardly directed shoulder of the shell between two radially outwardly extending protuberant surfaces, such as annularly formed beads. Examples of such an attachment are shown in U.S. Pat. No. 3,924,883 to Frank; U.S. Pat. No. 6,270,126 B1 to Juedes; and Japanese Pat. No. 5-118483 to Funato. Although these constructions may axially limit the movement of the shell relative to the tube, a disadvantage arises when the tube starts to rotate with the nut during its torquing. The installer will try to hold the shell static in order to prevent its rotation and linear misalignment. Although the shell has been inwardly compressed onto the conduit, it may still rotate relative to the conduit (and/or tube) if its contact with the tube does not prevent same. For example, if the inner surface of the shell shoulder is circular, the shell may be able to rotate relative to a cylindrical tube.

SUMMARY OF THE PRESENT INVENTION

The present invention provides a coupling for attachment to a conduit. The coupling has a longitudinal axis and is comprised of a tube and an attached tubular shell. This invention overcomes the obstacle of shell rotation relative to the tube, and tube movement during fixed attachment of the coupling to a mating end.

A feature of the present invention is to provide coupling where the tube has a first end, a second end and a longitudinal bore extending from the first end to the second end which is adapted for insertion into the conduit. The tube further includes an intermediate portion between the first and second ends having spaced first and second radially outwardly extending annular beads. The coupling is further comprised of a tubular shell having a first portion and a second portion. The first portion is axially confined between the first and second annular beads and has an inner surface with a first axial end and a second axial end, wherein one of the first and the second inner axial ends has a non-rounded shape. The shell second portion extends axially from the first portion to a free end and has an inner surface spaced radially and coaxially outwardly of the exterior of the tube second end to define an annular recess therebetween and is adapted to be inwardly deformed toward the tube second end.

A further feature of the noted coupling includes having at least one of the first and second non-rounded shaped inner surface axial ends being an elliptical shaped undercut located at the proximal end of the first portion. Another feature includes having an abutting portion of the first bead being permanently deformed into a similar shape as the adjoining elliptical shaped undercut as a result of formation of the second bead.

Still another feature of the noted coupling has at least an axial portion of the tube being other than straight. A further feature of the noted coupling has the tubular shell first portion having an exterior surface with a plurality of angularly spaced flat portions forming retaining flats.

Another feature of the noted coupling has the tubular shell first portion being comprised of two parts, a first surrounding part and an annular insert. The surrounding part has a longitudinal segment extending from the tubular shell second portion and a substantially radial segment having an end abutting the outer surface of the tube with an outer surface in contact with the first radially outwardly extending annular bead. The annular insert is axially symmetrical and has an outer surface in contact with the inner surface of the longitudinal segment. The annular insert further has a first annular surface in contact with the inner surface of the radial segment, and a second annular surface in contact with the second radially outwardly extending annular bead.

Still yet another feature of the noted coupling has the at least one non-rounded shaped inner surface of the tubular shell preventing the shell from rotating relative to the tube as a result of the formation of the second bead. The formation causes the permanent deformation of the abutting portion of the adjacent one of said first and second beads into a similar or conforming shape with said non-rounded shaped inner surface.

DETAILED DESCRIPTION OF THE PREFERRED EMBODIMENT

Figure 3:
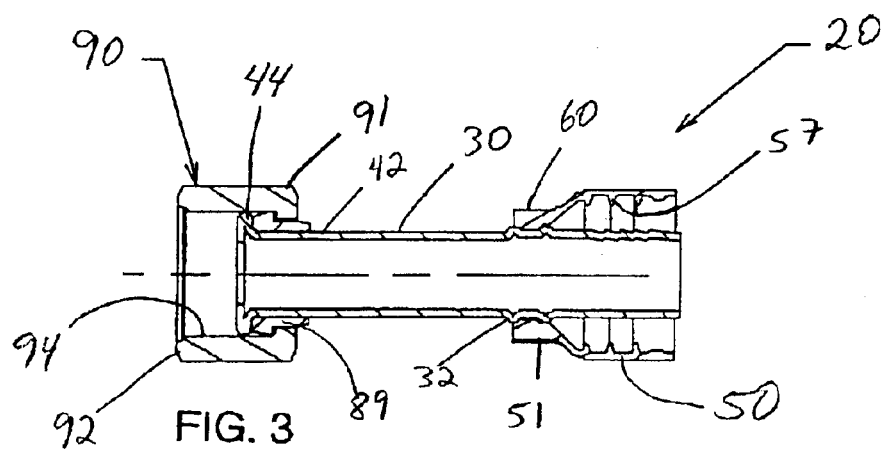
FIG. 3 is a cross-sectional view of a straight fitting, similar to that as shown in FIG. 2, with an added nut element, assembled according to the present invention.
Figure 1:
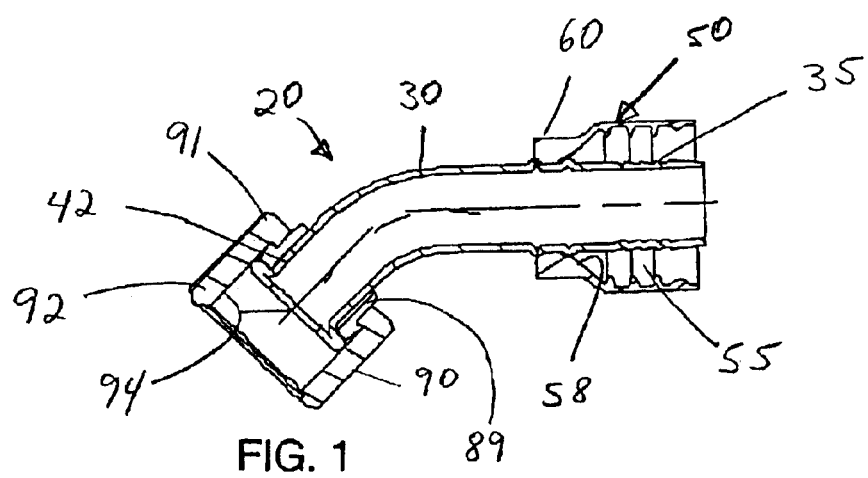
FIG. 1 is a longitudinal cross-sectional view of a fitting, having an angular orientation, according to the present invention.

Referring now to the drawings and particularly to FIG. 1, there is shown a longitudinal cross-section of a fitting 20, generally constructed of metal. Fitting 20 is comprised of a tube 30 with a rigidly attached shell 50 and rotatably attached, or swivel nut 90. In FIG. 1 tube 30 is shown bent at an about 45° angle, although tube 30 can take any desired angled or straight orientation, e.g. a straight variation as shown in FIG. 3. Shell 50 is attached to a first end 35 of tube 30. Nut 90 is attached to a second end 42 of tube 30.

Fitting 20 is typically used to fluidly connect a fluid conductor, e.g. a conduit, to a port or to another fluid conductor. Tube first end 35, and shell 50, receive the conduit, (not shown), such that tube first end 35 is inserted into the conduit and shell 50 circumferentially surrounds an equivalent length portion of the conduit. The conduit is longitudinally inserted or interposed into an annular space 55 between tube first end 35 and shell 50 so that it contacts an angled inner surface of an annular transition portion 58 thereof. The full peripheral extent of shell 50 is inwardly deformed such that conduit is compressively retained or sandwiched between shell 50 and tube 30.

Figure 4:
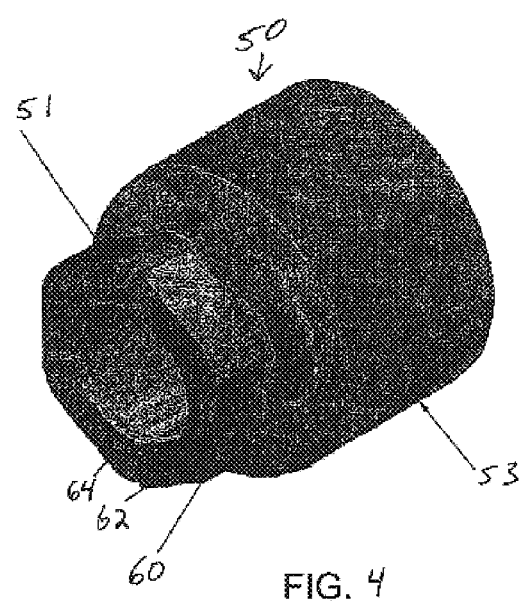
FIG. 4 is a perspective view of the shell according to the present invention.
Figure 6:
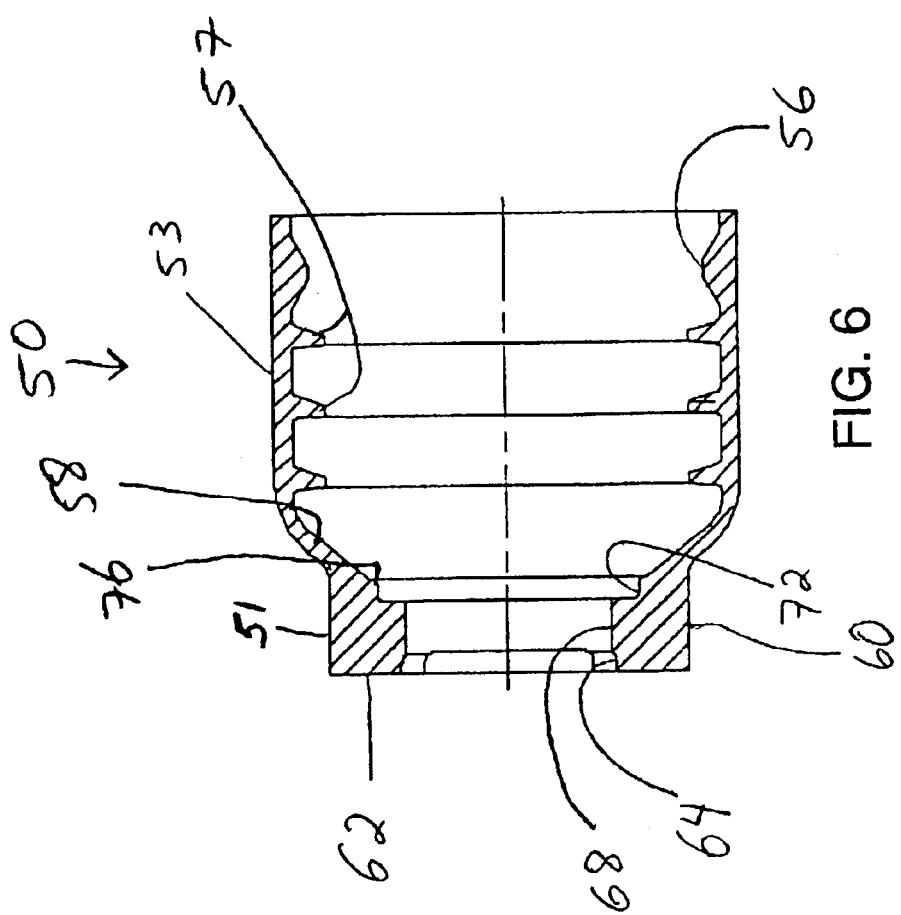
FIG. 6 is a longitudinal cross-sectional view of the shell taken along line 6—6 in FIG. 7.
Figure 7:
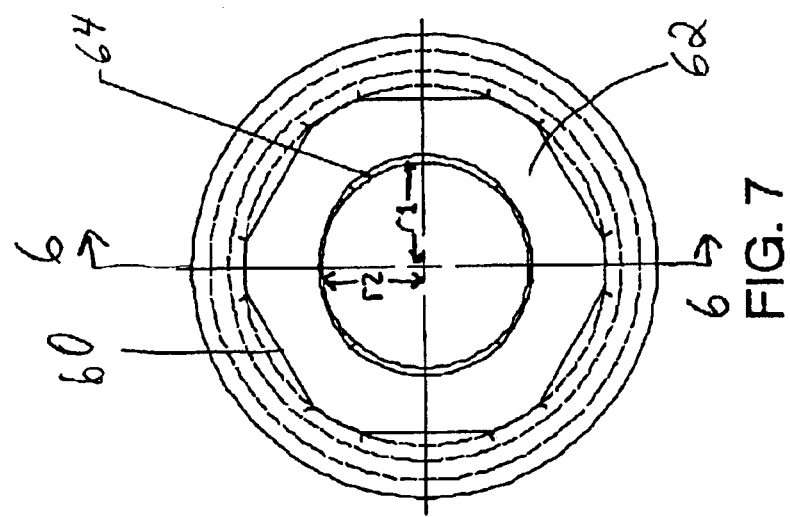
FIG. 7 is an enlarged frontal view of the shell of the present invention.

Referring now to FIGS. 4 and 6, shell 50 is comprised of a first portion 51 and a second portion 53 joined via annular portion 58. First portion 51 has an outer surface with a plurality of spaced retaining or wrench flats 60 along its periphery for gripping with a retaining tool, such as a wrench. An annular surface 62 is located at the proximal or outer end of first portion 51 and has a non-rounded, or oval, inner diameter defined by an inner elliptical surface, or undercut, 64 that is best shown in FIG. 7. Inner elliptical undercut 64 has a first radius r1 and a larger second radius r2 which together, provide, and define its oval shape. A flat, circular, cylindrical, inner surface 68 is adjacent elliptical undercut 64 and separates undercut 64 from an annular rounded groove 72 formed along the inner surface of first portion 51. The axial extent of surface 68 is substantially greater than that of both undercut 64 and groove 72. A stepped portion 76 is provided between rounded groove 72 and inner surface of annular transition portion 58, with portion 58 providing the transition from shell first portion 51 to shell second portion 53.

Shell second portion 53 has a smooth outer surface prior to being inwardly deformed onto a conduit (not shown). Spaced pluralities of inwardly directed teeth or spikes 57 are located on the inside surface of second portion 53 and serve to grip the conduit upon the inward deformation of shell 50. An inner rounded protuberance 56 is located at the distal or outer end of second shell portion 53 and provides a seal between shell 50 and the conduit.

Referring to FIGS. 1 and 3, nut 90 has a first or inner end 91 that is axially retained on tube second end 42 while still being able to swivel. Typically a second or outer end 92 of nut 90 is adapted to be attachable to another fluid conductor, e.g. an externally threaded fixed male port (not shown), by means of an internal threaded connection portion 94. Nut 90 typically has a series of spaced flat external surface portions, e.g. hex flats, for gripping with a retaining tool, such as a wrench in order to supply torque while tightening same. A contoured sleeve 89 is positioned and fixedly retained between nut 90 and tube second end 42 in order to support nut 90.

Prior to the attachment of nut 90 onto a mating male end, the conduit (not shown) is attached to fitting 20. Typically the conduit is positioned at a predetermined desired angle for proper installation while nut 90 is threaded onto its mating surface. For example, in order to prevent kinking of the conduit, or to prevent abrasion to its outside surface, the conduit is routed from one connector to the next in a predetermined fashion. Therefore, it is important for the conduit to remain correctly positioned or located during the threading attachment of nut 90. In order to threadingly attach nut 90 onto its mating port, torque is supplied to nut 90 until it reaches a predetermined sealing value. As is well known in the art, during this torquing process the friction between nut 90, sleeve 89 and tube 30 is increased such that input torque (e.g. by the wrench) is transferred to tube 30 and will cause tube 30 to rotate in the direction of the supplied torque. Since shell 50 is attached to tube 30, and the conduit is compressed between shell 50 and tube 30, the conduit will also rotate or move with the input torque, unless fitting 20 is held fixed while torque is supplied. Since the majority of fitting 20 is rounded, it is difficult to hold fitting 20 in place. For this reason, wrench flats 60 are provided on shell 50 so that the installer can hold fitting 20 in place, i.e. against rotation, during the torquing process.

The transfer torque is even more pronounced when tube 30 has an angular component, such as the 45° orientation, shown in FIG. 1, than when it is straight, as shown in FIG. 3. In these cases, if the installer happens to restrain the conduit during the attachment of nut 90 onto its connecting end, the conduit will twist, thus causing structural damage. Many times the conduit will be affixed at its other end, so any rotational movement of the conduit in this instance will be damaging. If the conduit is attached to angled fitting (as shown in FIG. 1), the conduit tends to kink at the point where it leaves fitting 20 if it is held during the torquing of nut 90. Thus the gripping of wrench flats 60, to immobilize fitting 20 during the torquing of nut 90 is not only advantageous for retaining the desired direction of the conduit, but it also helps prevent damage to the conduit itself.

It is equally important that shell 50 not rotate relative to tube 30 at any time during the attachment of nut 90 onto a mating male end or connecting port. Referring to FIG. 3, when the installer immobilizes wrench flats 60, against rotation, during the installation of nut 90 onto its connecting port, shell 50 and tube 30 should not rotate relative to each other. Such rotation can occur when nut 90 is so tight on its connecting port such that the friction between nut 90, sleeve 89 and tube 30 is great enough to cause tube 30 to rotate with nut 90. If shell 50 is not securely rotationally affixed to tube 30, it may turn relative to tube 30. This will cause damage to the conduit, since teeth 57 will lose their grip on the conduit thus possibly providing a leak path. Further more, the sealing connection between shell 50 and tube 30, located at the contact area of the inner surface of shell first portion 51 with tube 30, may be damaged if tube 30 rotates relative to shell 50.

Referring now to FIGS. 6 and 7, in order to prevent the noted rotation, shell first portion 51 is designed with an oval shaped inner diameter. Inner elliptical undercut 64 is shown with a first radius r1 and a second radius r2. R1 defines the smallest radial extent of elliptical inner surface, while r2 defines the largest extent. As will be discussed below, elliptical inner undercut 64 abuts a formed first radially outwardly extending annular bead 32 (as shown in FIG. 2) and is prevented from rotating relative to tube 30.

Figure 2:
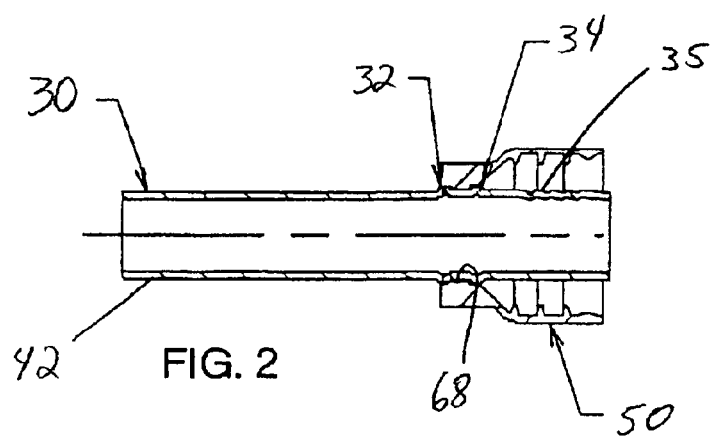
FIG. 2 is a longitudinal cross-sectional view of a tube element and an attached tubular shell according to the present invention.
Figure 5:
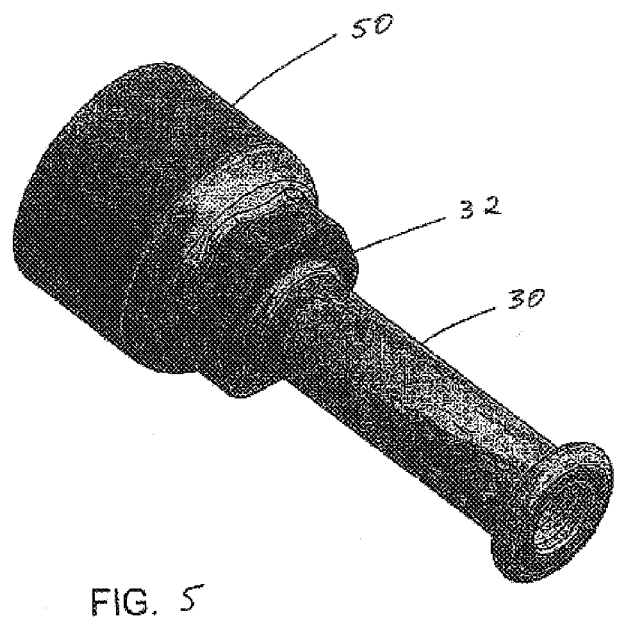
FIG. 5 is a perspective view of the tube element and attached shell according to the present invention.

Referring to FIGS. 2, 4 and 5, the formation of fitting 20 will now be discussed. First bead 32, which extends around the circumference of tube 30, is initially formed the outer surface thereof by any desired technique, such as by use of a punch tool. The width of first bead 32 is greater than twice the wall thickness of tube 30. Shell 50 is placed over tube end 35 so that elliptical inner undercut 64 is in abutting contact with bead 32. A second radially outwardly extending annular bead 34 is then formed, in a similar fashion as bead 32, and presses into annular rounded groove 72 (shown in FIG. 6). Similar to first bead 32, the width of second bead 34 is greater than twice the wall thickness of tube 30. Formation of second bead 34 compresses shell flat inner surface 68 between first and second beads 32, 34. Due to the force transferred during the formation of second bead 34, elliptical inner undercut 64 is axially and fixedly pressed into first bead 32 via permanent deformation or press-fitting thereof. This force causes first bead 32 to take a similar or conforming shape, i.e. oval, as undercut 64. The abutting contact between now conformably-deformed first bead 32 and elliptical inner undercut 64 prevents any rotational movement of shell 50 relative to tube 30.

The compression of flat inner surface 68 between first and second beads 32,34 also prevents any axial movement of shell 50 relative to tube 30. The thickness of flat inner surface 68, and the corresponding volume of material of shell first portion 51 between beads 32 and 34, allows shell 50 to withstand stresses transferred from the attached conduit when high-pressure fluids are transmitted within the conduit and when there is axial movement of the conduit. If flat inner surface 68, or shell first portion 51, are of insufficient thickness, pressures or axial forces exerted on the conduit would cause shell first portion 51 to deflect in the direction of the force, thus damaging the sealing and retention capabilities of fitting 20.

Referring again to FIGS. 2 and 3, contoured sleeve 89 and surrounding nut 90 are slipped onto tube 30 at second end 42. A face seal end 44 is formed in tube end 42 in order to hold sleeve 89 and nut 90 axially in place, relative to tube 30. Depending on the desired configuration of fitting 20, tube 30 can then be bent to the required angle or orientation, such as that shown in FIG. 1.

Figure 8:
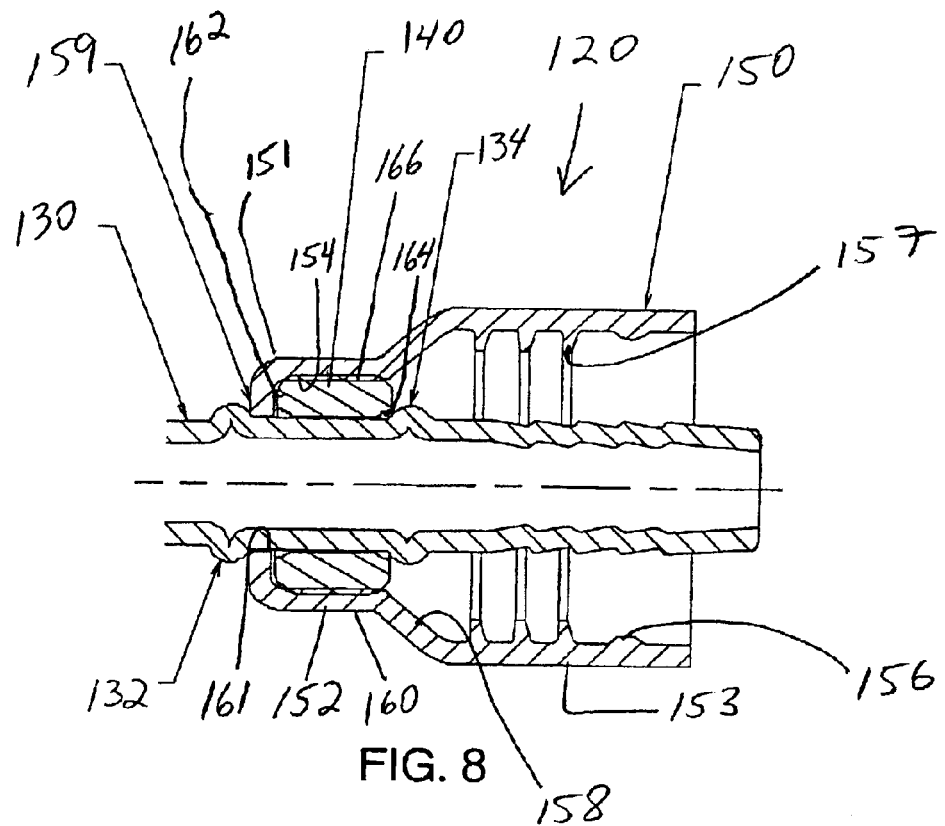
FIG. 8 is a further embodiment of the present invention, showing a partial view of a fitting in cross-section, particularly detailing the connection of a tube, an insert and a shell.
Figure 10:
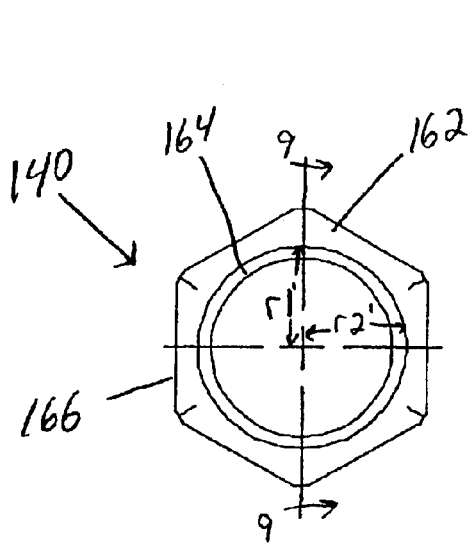
FIG. 10 is an enlarged frontal view of the insert of FIG. 9.
Figure 9:
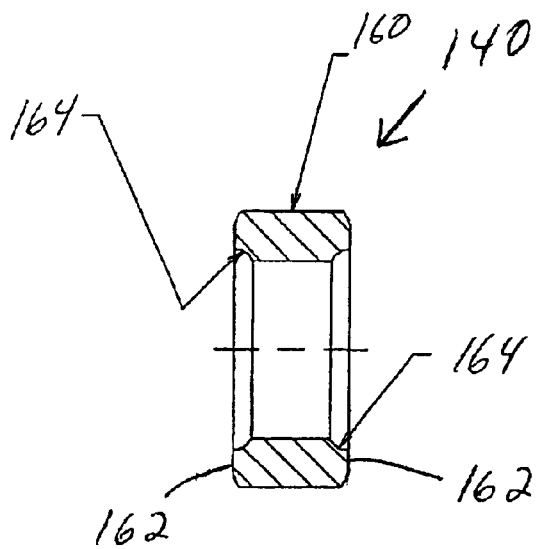
FIG. 9 is a side, cross-sectional view of the insert, taken along line 9—9 in FIG. 10.

Referring now to FIGS. 8, 9 and 10, a further embodiment 120 is shown therein. Fitting 120 is similar to fitting 20 described above, with the exception of an added insert 140 and a modified shell 150. Fitting 120 utilizes a tube 130 with two beads, 132 and 134, similar to tube 30 of fitting 20. Shell 150 has a first portion 151 and a second portion 153. Second portion 153 has a design similar to that of shell second portion 53, with a series of circumferential teeth 157 and a rounded surface 156 along its inner surface, and thus need not be discussed further.

The wall thickness of shell first portion 151 is constant throughout and has the same thickness as second portion 153, excluding teeth 157 and rounded surface portion 156. Shell first portion 151 includes a section 152 parallel with the longitudinal axis of fitting 120, having a depending shoulder 159 with an inner inwardly directed surface 161 which defines the smallest inner diameter of shell 150. Resembling the previously described wrench flats surface 60 of shell 50, shell first portion longitudinal section 152 similarly has an outer surface with a plurality of spaced retaining or wrench flats 160. Longitudinal section 152 has a non-rounded inner surface 154 axially extending from depending shoulder 159 to an angled inner wall of transition portion 158.

Insert 140 is axially symmetrical, having an annular surface 162 and an inner non-rounded, or elliptical, undercut 164 on both axial end faces. As an example, undercut 164 can have an oval shaped inner diameter with a first radius r1' and a second radius r2'. R1' signifies the smallest radial extent of undercut 164, while r2' is the largest extent. Shell first portion 151, together with shoulder 159 thereof, surrounds one annular surface 162 and an outer peripheral surface 166 of insert 140. Insert outer surface 166 is non-rounded and shaped similarly and conforms to that of adjacent first portion inner surface 154. For example, both insert outer surface 166 and longitudinal section inner surface 154 can have a hexagonal shape (as shown in FIG. 10) so that insert 140 cannot rotate relative to shell 150.

The assembly of fitting 120 will now be discussed. Similar to the formation of fitting 20, first bead 132 is formed within tube 130 and has a width greater than twice the wall thickness of tube 130. Shell 150 is slipped onto the outer surface of tube 130 so that one side of its depending shoulder 159 abuts one side of first bead 132 and its inwardly directed surface 161 contacts the outer surface of tube 130. Insert 140 is slipped onto the outer surface of tube 130 and positioned in abutting contact with the other side of depending shoulder 159. As mentioned above, insert outer peripheral surface 166 and shell inner peripheral surface 154 have similar conforming non-rounded shapes so that after insert 140 is press-fitted inside shell 150 it cannot rotate relative thereto. Due to its symmetrical design, insert 140 can be axially arranged either way without causing an assembly error. Thereafter, second bead 134 is formed, e.g. by means of a punch tool, and is fixedly pressed into elliptical undercut 164. At least the abutting portion of second bead 134 takes the form of elliptical undercut 164 as it is pressed thereinto, via permanent deformation thereof. The transfer force from the formation of second bead 134 axially compresses depending shoulder 159 between first bead 132 and insert 140, thus axially retaining shell 150 on tube 130.

For the same reasons as discussed above, retaining or wrench flats 160 provide a holding area for a wrench or similar tool during the affixing of the nut (see 90 in FIG. 3) onto its mating connection. By retaining fitting 120 in a fixed position or location during installation prevents misalignment of the conduit and damage thereto. Also as stated above, the fixed retention of insert 140, and the affixing of shell 150, onto tube 130 prevents both axial and rotational movements of insert 140, and shell 150, relative to tube 130. This stops leakage between shell 150, tube 130 and the conduit.

Referring again to FIGS. 1 and 6, it should be noted that although fitting 20 has been described with non-rounded undercut 64 located at the proximal end of first portion 51 and with annular rounded groove 72 formed at the opposite end of first portion 51, these inner annular shaped portions can be reversed so that the inner proximal end of first portion 51 is rounded and the inner distal end of first portion 51 is non-rounded. Such a design is similar to that of fitting 120 and would function similarly, i.e. with regard to the retention of shell 50 on tube 30 so as to prohibit both axial and rotational movements of shell 50 relative to tube 30.

What is claimed is:

1. A coupling for attachment to a conduit, said coupling having a longitudinal axis and being comprised of:
   a tube having a first end, a second end and a longitudinal bore extending from said first end to said second end, said second end being adapted for insertion into said conduit, said tube further comprising an intermediate portion between said first and second ends having spaced first and second radially outwardly extending annular beads; and
   a tubular shell having a first portion and a second portion, said first portion being axially confined between said first and said second radially outwardly extending annular beads and having an inner surface with a first axial end and a second axial end, wherein at least one of said first and said second inner surface axial ends has a non-rounded, substantially elliptical shaped undercut located at the proximal end of said first portion and at least an abutting portion of said first bead is permanently deformed into a similar shape as said adjoining substantially elliptical shaped undercut as a result of the formation of said second bead, said second portion extending axially from said first portion to a free end and having an inner surface spaced radially and coaxially outwardly of the exterior of said tube second end to define an annular recess therebetween and being adapted to be inwardly deformed toward said tube second end.

2. A coupling for attachment to a conduit, said coupling having a longitudinal axis and being comprised of:
   a tube having a first end, a second end and a longitudinal bore extending from said first end to said second end, said second end being adapted for insertion into said conduit, said tube further comprising an intermediate portion between said first and second ends having spaced first and second radially outwardly extending annular beads; and
   a tubular shell having a first portion and a second portion, said first portion;
      being comprised of two parts, a first surrounding part and an annular insert, said first surrounding part having a longitudinal segment extending from said tubular shell second portion and a substantially radial segment having an end abutting the outer surface of said tube and an outer surface in contact with said first radially outwardly extending annular bead, said annular insert being axially symmetrical and having an outer surface in contact with the inner surface of said longitudinal segment, said annular insert further having a first annular surface in contact with the inner surface of said radial segment, and a second annular surface in contact with said second radially outwardly extending annular bead, and
      being axially confined between said first and said second radially outwardly extending annular beads and having an inner surface with a first axial end and a second axial end, wherein at least one of said first and said second inner surface axial ends has a non-rounded shape, said second portion extending axially from said first portion to a free end and having an inner surface spaced radially and coaxially outwardly of the exterior of said tube second end to define an annular recess therebetween and being adapted to be inwardly deformed toward said tube second end.

3. A coupling for attachment to a conduit, said coupling having a longitudinal axis and being comprised of:
   a tube having a first end, a second end and a longitudinal bore extending from said first end to said second end, said second end being adapted for insertion into said conduit, said tube further comprising an intermediate portion between said first and second ends having spaced first and second radially outwardly extending annular beads; and
   a tubular shell having a first portion and a second portion, said first portion being axially confined between said first and said second radially outwardly extending annular beads and having an inner surface with a first axial end and a second axial end, wherein at least one of said first and said second inner surface axial ends has a non-rounded shape which prevents said shell from rotating relative to said tube as a result of the formation of said second bead, said formation causing the permanent deformation of the abutting portion of the adjacent one of said first and second beads into a similar or conforming shape with said non-rounded shaped inner surface, said second portion extending axially from said first portion to a free end and having an inner surface spaced radially and coaxially outwardly of the exterior of said tube second end to define an annular recess therebetween and being adapted to be inwardly deformed toward said tube second end.

4. The coupling as in claim 1, wherein at least an axial portion of said tube is other than straight.

5. The coupling as in claim 1, wherein said tubular shell first portion has an exterior surface with a plurality of angularly spaced flat portions forming retaining flats.

6. The coupling as in claim 5, wherein said retaining flats take the form of wrench flats.

* * * * *